(12) United States Patent
Seder et al.

(10) Patent No.: US 11,971,544 B2
(45) Date of Patent: Apr. 30, 2024

(54) HYBRID AUGMENTED REALITY HEAD-UP DISPLAY FOR CREATING AN EDGE-TO-EDGE AUGMENTED REALITY VIEW

(71) Applicant: GM Global Technology Operations LLC, Detroit, MI (US)

(72) Inventors: Thomas A. Seder, Fraser, MI (US); Kai-Han Chang, Sterling Heights, MI (US); Joseph F. Szczerba, Grand Blanc, MI (US); John P. Weiss, Shelby Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 90 days.

(21) Appl. No.: 17/749,464

(22) Filed: May 20, 2022

(65) Prior Publication Data

US 2023/0375829 A1 Nov. 23, 2023

(51) Int. Cl.
*G02B 27/01* (2006.01)
*B60K 35/00* (2006.01)
(Continued)

(52) U.S. Cl.
CPC .......... *G02B 27/0101* (2013.01); *B60K 35/00* (2013.01); *G06T 1/20* (2013.01); *G06T 11/00* (2013.01); *B60K 35/23* (2024.01); *B60K 35/28* (2024.01); *B60K 2360/166* (2024.01); *B60K 2360/167* (2024.01); *B60K 2360/168* (2024.01); *B60K 2360/177* (2024.01); *B60K 2360/178* (2024.01); *B60K 2360/29* (2024.01);
(Continued)

(58) Field of Classification Search
None
See application file for complete search history.

(56) References Cited

U.S. PATENT DOCUMENTS

2010/0253918 A1* 10/2010 Seder ................ G01S 13/867
353/13
2010/0274473 A1 10/2010 Konishi
(Continued)

FOREIGN PATENT DOCUMENTS

DE 102017130623 A1 6/2018
DE 102020124666 A1 3/2021
(Continued)

*Primary Examiner* — Jason A Pringle-Parker
(74) *Attorney, Agent, or Firm* — Vivacqua Crane, PLLC

(57) ABSTRACT

A hybrid augmented reality head-up display system for displaying graphics upon a windscreen of a vehicle includes a windscreen having a transparent substrate including light emitting particles dispersed within, a primary graphic projection device for generating a first set of images upon the windscreen of the vehicle based on visible light, and a secondary graphic projection device for generating a second set of images upon a secondary area the windscreen of the vehicle based on an excitation light. The first set of images are displayed upon a primary area of the windscreen. The light emitting particles in the windscreen emit visible light in response to absorbing the excitation light. The first set of images displayed upon the primary area of the windscreen cooperate with the second set of images displayed upon the secondary area of the windscreen to create an edge-to-edge augmented reality view.

19 Claims, 4 Drawing Sheets

(51) Int. Cl.
B60K 35/23 (2024.01)
B60K 35/28 (2024.01)
G06T 1/20 (2006.01)
G06T 11/00 (2006.01)

(52) U.S. Cl.
CPC ............ *G02B 2027/0123* (2013.01); *G02B 2027/0141* (2013.01); *G02B 2207/113* (2013.01)

(56) References Cited

U.S. PATENT DOCUMENTS

| | | |
|---|---|---|
| 2015/0321606 A1 | 11/2015 | Vartanian et al. |
| 2016/0111002 A1 | 4/2016 | Moise et al. |
| 2017/0212633 A1* | 7/2017 | You .................... B60K 37/06 |
| 2020/0242935 A1 | 7/2020 | Nagata et al. |
| 2020/0254877 A1* | 8/2020 | Nakajima .................. B60J 1/02 |
| 2021/0191132 A1* | 6/2021 | Karner .................. B60K 35/00 |
| 2021/0360211 A1* | 11/2021 | Kawamura .......... H04N 9/3129 |
| 2022/0317443 A1 | 10/2022 | Matsui et al. |
| 2023/0135641 A1 | 5/2023 | Miyake et al. |

FOREIGN PATENT DOCUMENTS

| | | |
|---|---|---|
| DE | 102021117850 A1 | 1/2022 |
| WO | 2013088510 A1 | 6/2013 |

\* cited by examiner

HYBRID AUGMENTED REALITY HEAD-UP DISPLAY FOR CREATING AN EDGE-TO-EDGE AUGMENTED REALITY VIEW

INTRODUCTION

The present disclosure relates to a hybrid augmented reality head-up display including a primary graphic projection device and a secondary graphic projection device that work together to create an edge-to-edge augmented reality view of a surrounding environment of the vehicle.

Augmented reality (AR) involves enhancing the real world with virtual elements that are shown in three-dimensional space and that permit real-time interaction with users. A head-up display (HUD) shows information such as, for example, vehicle speed and navigational instructions, directly onto a windscreen of a vehicle, within the driver's forward field of view. Accordingly, the head-up display provides drivers with information without looking away from the road. One possible implementation for augmented reality is an augmented reality head-up display (AR-HUD) for a vehicle. By overlaying images on the windscreen, AR-HUDs enhance a driver's view of the environment outside the vehicle, creating a greater sense of environmental awareness.

One challenge that AR-HUDs may experience is a limited field-of-view issue, which is sometimes referred to as the keyhole issue. Specifically, the AR-HUD may only be able to highlight a relatively small area of windscreen of the vehicle, where the small area of the windscreen is referred to as the keyhole. In general, the horizontal field-of-view of an AR-HUD may range from about ten to fifteen degrees. As a result, the AR-HUD may be unable to highlight features that are in a driver's peripheral field. For example, if an animal runs in front of the vehicle, the AR-HUD is unable to highlight and bring the animal to the driver's attention until the animal is viewable directly in front of the vehicle. Furthermore, the AR-HUD is unable to highlight objects that are outside of the keyhole in the driver's peripheral field. Additionally, because HUD tend to have a relatively small eyebox, they may not be used as primary instruments. The eyebox is a volume within the vehicle interior where the driver's eye receives an acceptable view of an image with respect to a set of criteria.

It may be challenging to simply increase the field-of-view of the AR-HUD due to the relatively large eye relief that is typically required in many vehicles. Eye relief refers to the distance measured between the driver's eyes and the windscreen. Moreover, the size of various optical components that are part of an AR-HUD projector depend upon the eye relief, where decreasing eye relief results in larger optical components. As a result, reducing the eye relief may result in very large package sizes required by the AR-HUD, which may be difficult, if not impossible to accommodate. Finally, there is an increasing demand for wider fields-of-view across the entire windscreen.

Thus, while current AR-HUDs achieve their intended purpose, there is a need in the art for an improved AR-HUD having an increased field-of-view.

SUMMARY

According to several aspects, a hybrid augmented reality head-up display system for displaying graphics upon a windscreen of a vehicle is disclosed, where the windscreen includes a transparent substrate including light emitting particles dispersed within. The hybrid augmented reality head-up display system includes a primary graphic projection device for generating a first set of images upon the windscreen of the vehicle based on visible light, where the first set of images are displayed upon a primary area of the windscreen. The hybrid augmented reality head-up display system also includes a secondary graphic projection device for generating a second set of images upon a secondary area the windscreen of the vehicle based on an excitation light, where the light emitting particles in the windscreen emit visible light in response to absorbing the excitation light, and wherein the first set of images displayed upon the primary area of the windscreen cooperate with the second set of images displayed upon the secondary area of the windscreen to create an edge-to-edge augmented reality view of a surrounding environment of the vehicle.

In one aspect, the hybrid augmented reality head-up display system also includes a primary graphics processing unit in electronic communication with the primary graphic projection device and a secondary graphics processing unit in electronic communication with the secondary graphic projection device.

In another aspect, the hybrid augmented reality head-up display system also includes one or more controllers in electronic communication with the primary graphics processing unit and the secondary graphics processing unit.

In yet another aspect, the one or more controllers executes instructions to determine an object of interest is located within the secondary area of the windscreen, and in response to determining the object of interest is located within the secondary area of the windscreen, instruct the secondary graphics processing unit to determine a graphical representation of the second set of images that are generated by the secondary graphic projection device.

In an aspect, the second set of images include one or more primitive graphic objects.

In another aspect, the one or more primitive graphic objects include one or more of the following: a point-position and a straight line.

In still another aspect, the one or more controllers execute instructions to instruct the secondary graphics processing unit to follow the object of interest by the graphical representation of the second set of images as the object of interest travels from the secondary area of the windscreen towards the primary area of the windscreen.

In an aspect, the one or more controllers execute instructions to determine the object of interest has entered the primary area of the windscreen, and in response to determining the object of interest has entered the primary area of the windscreen, instruct the primary graphics processing unit to determine a graphical representation of the first set of images generated by the primary graphic projection device.

In another aspect, the first set of images are augmented reality graphics that are overlain and aligned with objects located in the surrounding environment of the vehicle.

In yet another aspect, the primary graphic projection device is a single image plane augmented reality head-up display including a digital light projector (DLP) optical system.

In an aspect, the primary graphic projection device is a fixed dual image plane holographic augmented reality head-up display.

In another aspect, the primary graphic projection device generates a dual image plane including a near-field image plane and a far-field image plane.

In yet another aspect, the first set of images include cluster content information projected upon the near-field image plane and augmented reality graphics projected upon the far-field image plane.

In an aspect, the excitation light is one or more of the following: a violet light in the visible spectrum or ultraviolet light that induces fluorescence in the light emitting particles.

In an aspect, a hybrid augmented reality head-up display system for a vehicle includes a windscreen including a transparent substrate, where light emitting particles are dispersed within the transparent substrate. The hybrid augmented reality head-up display system also includes a primary graphic projection device for generating a first set of images upon the windscreen of the vehicle based on visible light, where the first set of images are displayed upon a primary area of the windscreen. The hybrid augmented reality head-up display system a secondary graphic projection device for generating a second set of images upon a secondary area the windscreen of the vehicle based on an excitation light, where the light emitting particles in the windscreen emit visible light in response to absorbing the excitation light, and where the first set of images displayed upon the primary area of the windscreen cooperate with the second set of images displayed upon the secondary area of the windscreen to create an edge-to-edge augmented reality view of a surrounding environment of the vehicle. The hybrid augmented reality head-up display system includes a primary graphics processing unit in electronic communication with the primary graphic projection device, a secondary graphics processing unit in electronic communication with the secondary graphic projection device, and one or more controllers in electronic communication with the primary graphics processing unit and the secondary graphics processing unit.

In an aspect, the light emitting particles are red, green, and blue (RGB) phosphors.

In another aspect, the one or more controllers execute instructions to determine an object of interest is located within the secondary area of the windscreen, and in response to determining the object of interest is located within the secondary area of the windscreen, instruct the secondary graphics processing unit to determine a graphical representation of the second set of images that are generated by the secondary graphic projection device.

In yet another aspect, the one or more controllers execute instructions to instruct the secondary graphics processing unit to follow the object of interest by the graphical representation of the second set of images as the object of interest travels from the secondary area of the windscreen towards the primary area of the windscreen.

In an aspect, the one or more controllers execute instructions to determine the object of interest has entered the primary area of the windscreen, and in response to determining the object of interest has entered the primary area of the windscreen, instruct the primary graphics processing unit to determine a graphical representation of the first set of images generated by the primary graphic projection device.

In another aspect, the first set of images are augmented reality graphics that are overlain and aligned with objects located in the surrounding environment of the vehicle.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
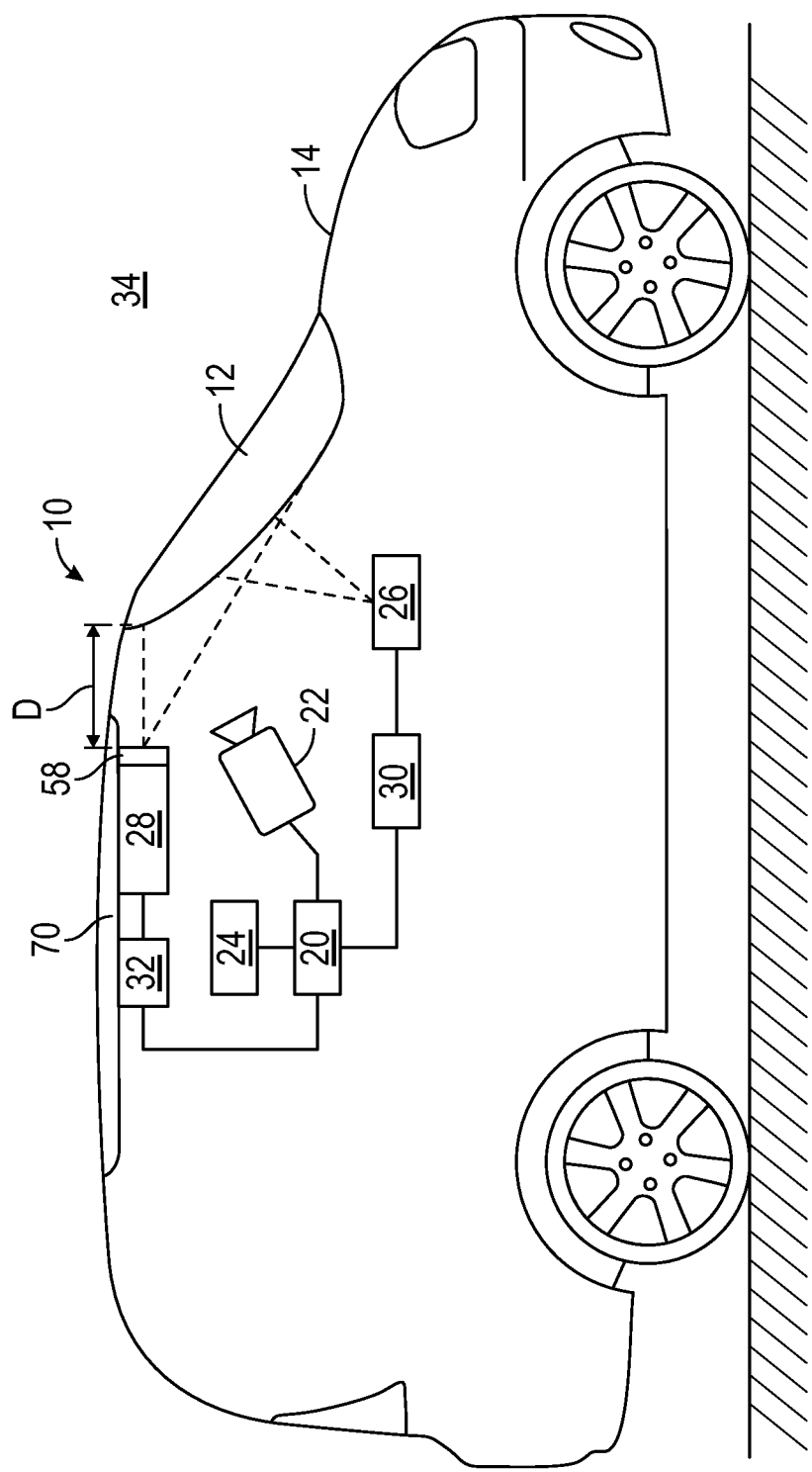
FIG. 1 is a schematic diagram of the disclosed hybrid augmented reality head-up display system for displaying graphics upon a windscreen of a vehicle, according to an exemplary embodiment.

Referring to FIG. 1, an exemplary hybrid augmented reality head-up display system 10 for displaying graphics upon a windscreen 12 of a vehicle 14 is illustrated. As explained below, the hybrid augmented reality head-up display system 10 includes a primary graphic projection device 26 and a secondary graphic projection device 28 that work together to provide an augmented reality experience for an occupant of the vehicle 14. It is to be appreciated that the vehicle 14 may be any type of vehicle such as, but not limited to, a sedan, truck, sport utility vehicle, van, or motor home. The hybrid augmented reality head-up display system 10 includes one or more controllers 20 in electronic communication with one or more image-capturing devices 22, an eye location system 24, a primary graphics processing unit 30 corresponding to the primary graphic projection device 26, and a secondary graphics processing unit 32 corresponding to the secondary graphic projection device 28. The image-capturing devices 22 may be cameras that obtain periodic or sequential images representing a view of a surrounding environment 34 of the vehicle 14. The eye location system 24 includes one or more sensors for determining the location of a head of the driver of the vehicle 14 as well as the orientation or gaze location of the driver's eyes.

Figure 2A:
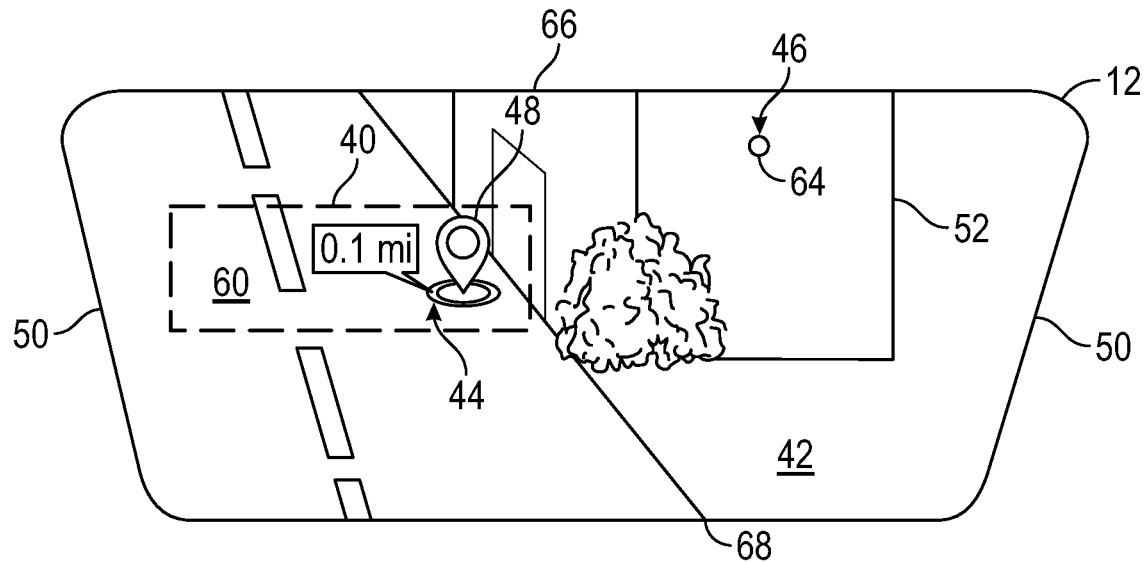
FIG. 2A is an embodiment of the windscreen as viewed by an occupant of the vehicle, according to an exemplary embodiment.
Figure 2B:
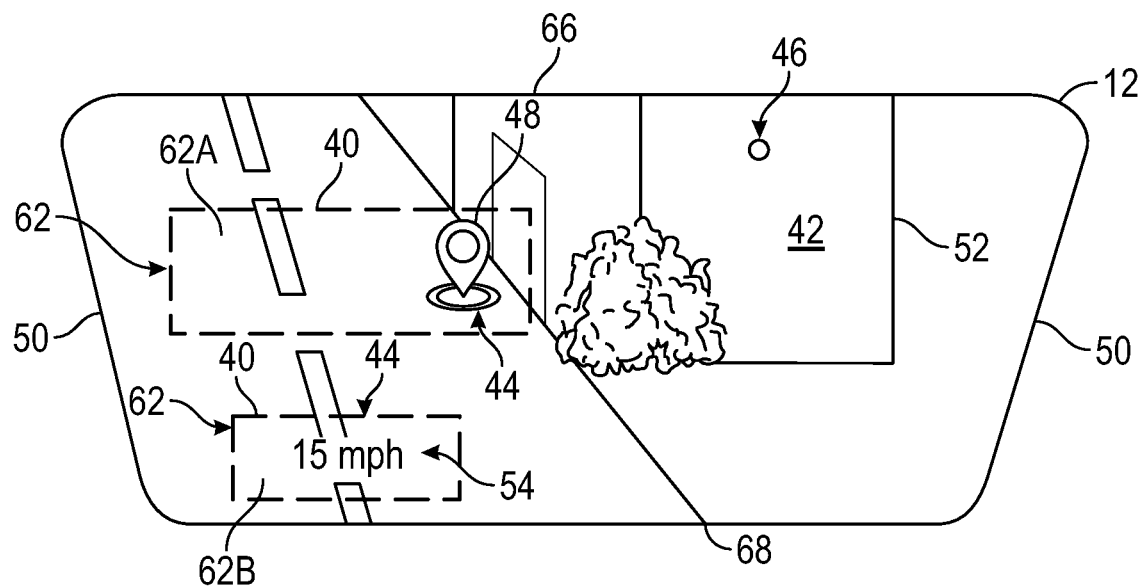
FIG. 2B is another embodiment of the windscreen as viewed by the occupant, according to an exemplary embodiment.
Figure 2C:
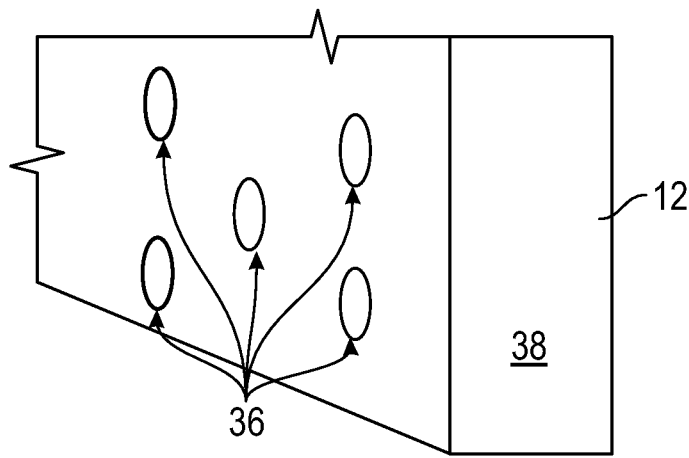
FIG. 2C is an enlarged view of a section of the windscreen including a plurality of light emitting particles dispersed within a substantially transparent substrate, according to an exemplary embodiment.

FIG. 2A is one embodiment a front view of the windscreen 12 when viewed by an occupant of the vehicle 14, FIG. 2B is an alternative embodiment of the windscreen 12 in FIG. 2A, and FIG. 2C is an enlarged view of a section of the windscreen 12. As seen in FIG. 2C, the windscreen 12 includes a plurality of light emitting particles 36 that are dispersed within a substantially transparent substrate 38. When excitation light is absorbed by the light emitting particles 36, visible light is generated by the light emitting particles 36. In an embodiment, the light emitting particles are red, green, and blue (RGB) phosphors for full color operation, however, it is to be appreciated that monochrome or a two-color phosphor may be used as well.

Referring to both FIGS. 1 and 2A, the windscreen 12 includes a primary area 40 and a secondary area 42, where the primary graphic projection device 26 generates a first set of images 44 upon the primary area 40 of the windscreen 12 based on visible light, and the secondary graphic projection device generates a second set of images 46 upon the secondary area 42 the windscreen 12 of the vehicle based on an excitation light. Specifically, the light emitting particles 36 (FIG. 2C) dispersed within the windscreen 12 emit visible light in response to absorbing the excitation light emitted by the secondary graphic projection device 28. As explained below, the first set of images 44 displayed upon the primary area 40 of the windscreen 12 cooperate with the second set of images 46 displayed upon the secondary area 42 of the windscreen 12 to create an edge-to-edge augmented reality view of the surrounding environment 34 of the vehicle 14. As seen in FIG. 2A, the primary area 40 of the windscreen 12 only includes a portion of the windscreen 12 having a limited field-of-view, while the secondary area 42 of the windscreen 12 includes a remaining portion of the windscreen 12 that is not included as part of the primary area 40. Combining the primary area 40 with the secondary area 42 results in an augmented reality view of the surrounding environment 34 of the vehicle 14 that spans from opposing side edges 50 of the windscreen 12.

Still referring to FIGS. 1 and 2A, the primary graphics processing unit 30 is in electronic communication with the primary graphic projection device 26, where the primary graphics processing unit 30 translates image based instructions from the one or more controllers 20 into a graphical representation of the first set of images 44 generated by the primary graphic projection device 26. The first set of images 44 are augmented reality graphics 48 that are overlain and aligned with one or more objects of interest located in the surrounding environment 34 of the vehicle 14 to provide an occupant with a virtual reality experience. In the example as shown in FIG. 2A, the augmented reality graphics 48 include a destination pin and text that reads "0.1 mi" that are overlain and aligned with an object of interest, which is a building 52. It is to be appreciated that the destination pin and text as shown in FIG. 2A is merely exemplary in nature and that other types of augmented reality graphics may be used as well. Some examples of augmented reality graphics 48 include, for example, circles or boxes that surround an object of interest, arrows, warning symbols, text, numbers, colors, lines, indicators, and logos.

The primary graphic projection device 26 includes a visible light source configured to generate the first set of images 44 upon the windscreen 12. The visible light source may be, for example, a laser or light emitting diodes (LEDs). In the embodiment as shown in FIG. 2A, the primary area 40 of the windscreen 12 includes a single image plane 60, and the primary graphic projection device 26 is a single image plane augmented reality head-up display including a digital light projector (DLP) optical system. In an embodiment, the primary area 40 of the windscreen 12 includes a 10° horizontal field-of-view and up to a 5° vertical field-of-view.

In the alternative embodiment as shown in FIG. 2B, the primary area 40 of the windscreen 12 includes a dual image plane 62, and the primary graphic projection device 26 (FIG. 1) is a fixed dual image plane holographic augmented reality head-up display. In one embodiment, the dual image plane 62 may include a first, near-field image plane 62A and a second, far-field image plane 62B. In the present example, the first set of images 44 include both cluster content information 54 projected upon the near-field image plane 62A and the augmented reality graphics 48 projected upon the far-field image plane 62B. The cluster content information 54 informs the driver of the vehicle 14 of driving conditions such as, but not limited to, vehicle speed, speed limit, gear position, fuel level, current position, and navigational instructions. In the example as shown in FIG. 2B, the cluster content information 54 includes vehicle speed.

Referring to FIGS. 1 and 2A, the secondary graphics processing unit 32 is in electronic communication with the secondary graphic projection device 28, where the secondary graphics processing unit 32 translates image based instructions from the controllers 20 into a graphical representation of the second set of images 46 generated by the secondary graphic projection device 28. The second set of images 46 include one or more primitive graphic objects 64. In the example as shown in FIG. 2A, the primitive graphic object 64 is a point-position or pixel. Other examples of primitive graphic objects 64 include straight lines. As explained below, objects in the surrounding environment 34 first appear in a periphery field of a driver, which is in the secondary area 42 of the windscreen 12, as the primitive graphic object 64. An object of interest located in the secondary area 42 of the windscreen 12 is first brought to the attention of the driver by highlighting the object with the secondary set of images 46 (i.e., the primitive graphic object 64). Once the object of interest travels from the secondary area 42 of the windscreen 12 into the primary area 40 of the windscreen 12, the object of interest is highlighted by the primary set of images 44 (i.e., the augmented reality graphic 48) instead.

The secondary graphic projection device 28 includes an excitation light source configured to generate the second set of images upon the windscreen 12. Specifically, the light emitting particles 36 (FIG. 2C) dispersed within the windscreen 12 emit visible light in response to absorbing the excitation light emitted by the secondary graphic projection device 28. In embodiments, the excitation light is either a violet light in the visible spectrum (ranging from about 380 to 450 nanometers) or ultraviolet light that induces fluorescence in the light emitting particles 36. It is to be appreciated that since the light emitting particles 36 is dispersed throughout the windscreen 12, there is no directionality in the fluorescence irradiated by the light emitting particles 36. Therefore, no matter where the occupant is located within the vehicle 14, the fluorescence is always visible. In other words, no eyebox exists, and therefore the disclosed hybrid augmented reality head-up display system 10 may be used as a primary instrument. The excitation light source may be, for example, a laser or LEDs. In embodiments, the secondary graphic projection device 28 is a pico-projector having a relatively small package size and weight. For example, in one implementation the pico-projector weighs about 120 grams.

Referring to FIGS. 1, 2A, and 2B, in an embodiment the secondary graphic projection device 28 may be placed along a headliner 70 of the vehicle 14. A throw distance D is measured from the windscreen 12 to a projection lens 58 of the secondary graphic projection device 28. The throw distance D is dimensioned so that the secondary area 42 of the windscreen 12 spans from opposing side edges 50 of the windscreen 12 and between a top edge 66 of the windscreen 12 to a bottom edge 68 of the windscreen 12.

Figure 3:
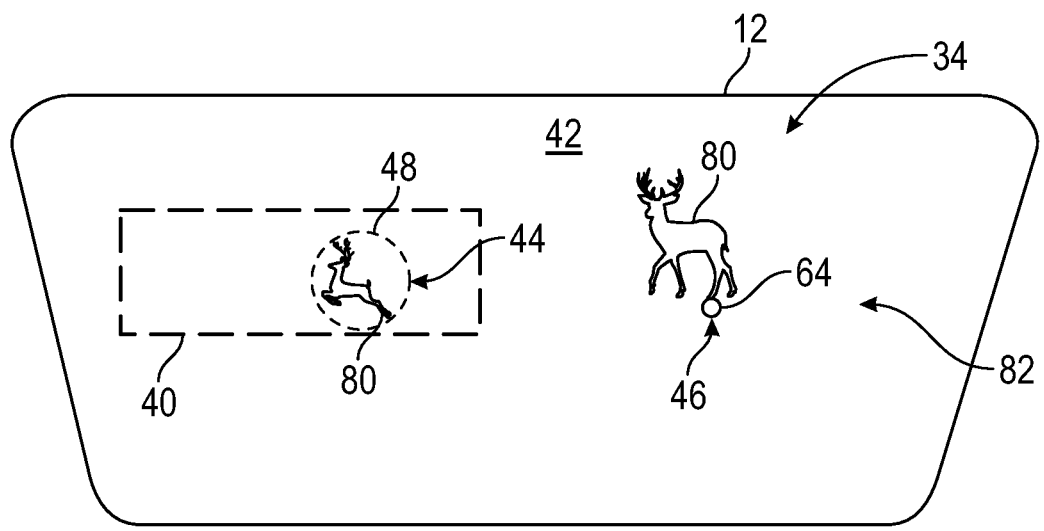
FIG. 3 is an illustration of the windscreen where a first set of images are shown upon a primary area of the windscreen and a second set of images are shown upon a secondary area the windscreen, according to an exemplary embodiment.

FIG. 3 is an illustration of the windscreen 12 highlighting an object of interest 80, which is a deer, located within the surrounding environment 34 of the vehicle 14. Although a deer is illustrated, it is to be appreciated that FIG. 3 is merely exemplary in nature, and the object of interest 80 is any object located in the surrounding environment 34 of the vehicle 14 that the disclosed hybrid augmented reality head-up display system 10 may want to bring to a driver's attention such as, for example, a child on a bicycle, another vehicle, weather conditions, roadway conditions, obstructions, pedestrians, emergency vehicles, point-of-interests, roadway signs, billboards, and destinations.

In the example as shown in FIG. 3, the hybrid augmented reality head-up display system 10 is tracking a deer that darts from a right peripheral view 82 of the surrounding environment 34 and travels directly in front of the vehicle 14. Specifically, referring to both FIGS. 1 and 3, the one or more controllers 20 first detect the object of interest 80 within the secondary area 42 of the windscreen 12. In response to detecting the object of interest 80, the one or more controllers 20 bring the object of interest 80 to the attention of the driver by highlighting the object with the secondary set of images 46. The object of interest 80 is highlighted by the primitive graphic object 64 (i.e., a point-position). The primitive graphic object 64 follows or tracks the object of interest 80 as the object of interest 80 travels towards the primary area 40. Once the object of interest 80 enters the primary area 40 of the windscreen 12, the one or more controllers 20 seamlessly switch from highlighting the object of interest 80 with the primitive graphic object 64 to highlighting the object of interest 80 with the augmented reality graphics 48. In the example as shown in FIG. 3, the augmented reality graphics 48 include a circle that surrounds the object of interest 80.

Figure 4:
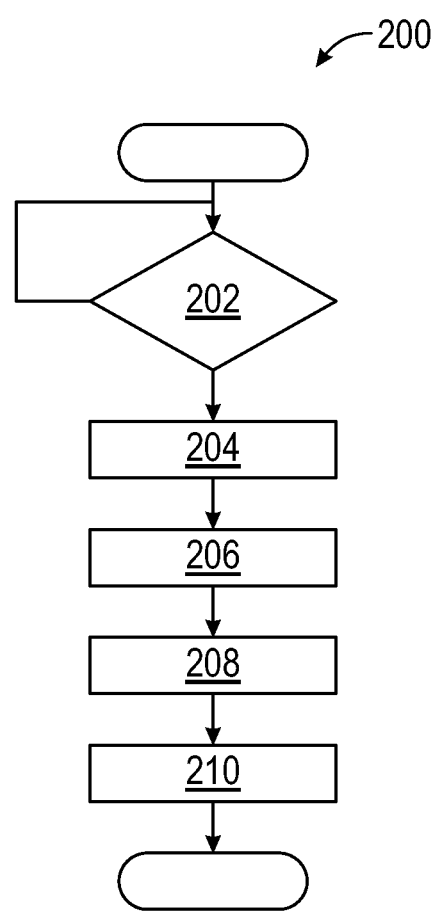
FIG. 4 is a process flow diagram illustrating a method for highlighting an object of interest located within a surrounding environment of the vehicle by the hybrid augmented reality head-up display system, according to an exemplary embodiment.

FIG. 4 is a process flow diagram illustrating a method 200 for highlighting the object of interest 80 located within the surrounding environment 34 of the vehicle 14 (seen in FIG. 3). Referring to FIGS. 1, 3, and 4, the method 200 begins at block 202. In block 202 the one or more controllers 20 monitor image data representing the surrounding environment 34 of the vehicle 14 from the image-capturing devices 22. The one or more controllers 20 continues to monitor the image data until determining the object of interest 80 is located within the secondary area 42 of the windscreen 12 based on the image data. The method 200 may then proceed to block 204.

In block 204, in response to determining the object of interest 80 is located within the secondary area 42 of the windscreen 12, the one or more controllers 20 instruct the secondary graphics processing unit 32 to determine a graphical representation of the second set of images 46 that are generated by the secondary graphic projection device 28. As seen in FIG. 3, the second set of images 46 include one or more primitive graphic objects 64. Specifically, in the example as shown in 3, the primitive graphic object 64 is a point-position. The method 200 may then proceed to block 206.

In block 206, the one or more controllers 20 instruct the secondary graphics processing unit 32 to follow the object of interest 80 by the graphical representation of the second set of images 46 as the object of interest 80 travels from the secondary area 42 of the windscreen 12 towards the primary area 40 of the windscreen 12. In the example as shown in FIG. 3, the deer darts from the right peripheral view 82 of the surrounding environment 34 and towards the primary area 40 of the windscreen 12. The method 200 may then proceed to block 208.

In block 208, the one or more controllers 20 determine the object of interest 80 has entered the primary area 40 of the windscreen 12. The method 200 may then proceed to block 210.

In block 210, in response to determining the object of interest 80 has entered the primary area 40 of the windscreen 12, the one or more controllers 20 instruct the primary graphics processing unit 30 to determine a graphical representation of the first set of images 44 that are generated by the primary graphic projection device 26. In the example as shown in FIG. 3, the first set of images 44 include a circle that surrounds the deer. The method 200 may then terminate.

Referring generally to the figures, the disclosed hybrid augmented reality head-up display system provides various technical effects and benefits. Specifically, the first set of images displayed by the primary graphic projection device cooperate with the second set of images displayed by the secondary graphic projection device to create an edge-to-edge augmented reality view of the surrounding environment of the vehicle. It is to be appreciated that since there is no directionality in the fluorescence irradiated by the light emitting particles in the windscreen, no eyebox exists. Thus, unlike conventional augmented reality systems that are presently available, the disclosed hybrid augmented reality head-up display may be used as a primary instrument.

The controllers may refer to, or be part of an electronic circuit, a combinational logic circuit, a field programmable gate array (FPGA), a processor (shared, dedicated, or group) that executes code, or a combination of some or all of the above, such as in a system-on-chip. Additionally, the controllers may be microprocessor-based such as a computer having a at least one processor, memory (RAM and/or ROM), and associated input and output buses. The processor may operate under the control of an operating system that resides in memory. The operating system may manage computer resources so that computer program code embodied as one or more computer software applications, such as an application residing in memory, may have instructions executed by the processor. In an alternative embodiment, the processor may execute the application directly, in which case the operating system may be omitted.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A hybrid augmented reality head-up display system for displaying graphics upon a windscreen of a vehicle, wherein the windscreen includes a transparent substrate including light emitting particles dispersed within, the hybrid augmented reality head-up display system comprising:
   a primary graphic projection device including a visible light source that generates a first set of images upon the windscreen of the vehicle based on visible light, wherein the first set of images are displayed upon a primary area of the windscreen;
   a secondary graphic projection device including an excitation light source that generates a second set of images upon a secondary area the windscreen of the vehicle based on an excitation light, wherein the light emitting particles in the windscreen emit visible light in response to absorbing the excitation light, and wherein the first set of images displayed upon the primary area of the windscreen cooperate with the second set of images displayed upon the secondary area of the windscreen to create an edge-to-edge augmented reality view of a surrounding environment of the vehicle;

a primary graphics processing unit in electronic communication with the primary graphic projection device;

a secondary graphics processing unit in electronic communication with the secondary graphic projection device; and one or more controllers in electronic communication with the primary graphics processing unit and the secondary graphics processing unit, wherein the one or more controllers execute instructions to:

determine an object of interest is located within the secondary area of the windscreen;

in response to determining the object of interest is located within the secondary area of the windscreen, instruct the secondary graphics processing unit to determine a graphical representation of the second set of images that are generated by the secondary graphic projection device;

instruct the secondary graphics processing unit to follow the object of interest by the graphical representation of the second set of images as the object of interest travels from the secondary area of the windscreen towards the primary area of the windscreen;

determine the object of interest has entered the primary area of the windscreen; and in response to determining the object of interest has entered the primary area of the windscreen, instruct the primary graphics processing unit to determine a graphical representation of the first set of images generated by the primary graphic projection device.

2. The hybrid augmented reality head-up display system of claim 1, wherein the second set of images include one or more primitive graphic objects.

3. The hybrid augmented reality head-up display system of claim 2, wherein the one or more primitive graphic objects include one or more of the following: a point-position and a straight line.

4. The hybrid augmented reality head-up display system of claim 1, wherein the first set of images are augmented reality graphics that are overlain and aligned with objects located in the surrounding environment of the vehicle.

5. The hybrid augmented reality head-up display system of claim 1, wherein the primary graphic projection device is a single image plane augmented reality head-up display including a digital light projector (DLP) optical system.

6. The hybrid augmented reality head-up display system of claim 1, wherein the primary graphic projection device is a fixed dual image plane holographic augmented reality head-up display.

7. The hybrid augmented reality head-up display system of claim 6, wherein the primary graphic projection device generates a dual image plane including a near-field image plane and a far-field image plane.

8. The hybrid augmented reality head-up display system of claim 7, wherein the first set of images include cluster content information projected upon the near-field image plane and augmented reality graphics projected upon the far-field image plane.

9. The hybrid augmented reality head-up display system of claim 1, wherein the excitation light is one or more of the following: a violet light in the visible spectrum or ultraviolet light that induces fluorescence in the light emitting particles.

10. The hybrid augmented reality head-up display system of claim 1, wherein the visible light source includes one or more of the following: a laser and a plurality of light emitting diodes (LEDs).

11. A hybrid augmented reality head-up display system for a vehicle, comprising:

a windscreen including a transparent substrate, wherein light emitting particles are dispersed within the transparent substrate;

a primary graphic projection device including a visible light source that generates a first set of images upon the windscreen of the vehicle based on visible light, wherein the first set of images are displayed upon a primary area of the windscreen;

a secondary graphic projection device including an excitation light source that generates a second set of images upon a secondary area the windscreen of the vehicle based on an excitation light, wherein the light emitting particles in the windscreen emit visible light in response to absorbing the excitation light, and wherein the first set of images displayed upon the primary area of the windscreen cooperate with the second set of images displayed upon the secondary area of the windscreen to create an edge-to-edge augmented reality view of a surrounding environment of the vehicle;

a primary graphics processing unit in electronic communication with the primary graphic projection device;

a secondary graphics processing unit in electronic communication with the secondary graphic projection device; and one or more controllers in electronic communication with the primary graphics processing unit and the secondary graphics processing unit, wherein the one or more controllers execute instructions to:

determine an object of interest is located within the secondary area of the windscreen; and in response to determining the object of interest is located within the secondary area of the windscreen, instruct the secondary graphics processing unit to determine a graphical representation of the second set of images that are generated by the secondary graphic projection device;

instruct the secondary graphics processing unit to follow the object of interest by the graphical representation of the second set of images as the object of interest travels from the secondary area of the windscreen towards the primary area of the windscreen;

determine the object of interest has entered the primary area of the windscreen; and in response to determining the object of interest has entered the primary area of the windscreen, instruct the primary graphics processing unit to determine a graphical representation of the first set of images generated by the primary graphic projection device.

12. The hybrid augmented reality head-up display system of claim 11, wherein the light emitting particles are red, green, and blue (RGB) phosphors.

13. The hybrid augmented reality head-up display system of claim 11, wherein the first set of images are augmented reality graphics that are overlain and aligned with objects located in the surrounding environment of the vehicle.

14. A hybrid augmented reality head-up display system for displaying graphics upon a windscreen of a vehicle, wherein the windscreen includes a transparent substrate including light emitting particles dispersed within, the hybrid augmented reality head-up display system comprising:

a primary graphic projection device including a visible light source that generates a first set of images upon the windscreen of the vehicle based on visible light, wherein the first set of images are displayed upon a primary area of the windscreen, and wherein the primary graphic projection device is a fixed dual image plane holographic augmented reality head-up display and the primary graphic projection device generates a dual image plane including a near-field image plane and a far-field image plane, and wherein the first set of images include cluster content information projected upon the near-field image plane and augmented reality graphics projected upon the far-field image plane; and a secondary graphic projection device including an excitation light source that generates a second set of images upon a secondary area the windscreen of the vehicle based on an excitation light, wherein the light emitting particles in the windscreen emit visible light in response to absorbing the excitation light, and wherein the first set of images displayed upon the primary area of the windscreen cooperate with the second set of images displayed upon the secondary area of the windscreen to create an edge-to-edge augmented reality view of a surrounding environment of the vehicle.

15. The hybrid augmented reality head-up display system of claim 14, wherein the cluster content information includes one or more of the following: vehicle speed, speed limit, gear position, fuel level, current position, and navigational instructions.

16. The hybrid augmented reality head-up display system of claim 14, wherein the second set of images include one or more primitive graphic objects.

17. The hybrid augmented reality head-up display system of claim 16, wherein the one or more primitive graphic objects include one or more of the following: a point-position and a straight line.

18. The hybrid augmented reality head-up display system of claim 14, wherein the augmented reality graphics are overlain and aligned with objects located in the surrounding environment of the vehicle.

19. The hybrid augmented reality head-up display system of claim 14, wherein the excitation light is one or more of the following: a violet light in the visible spectrum or ultraviolet light that induces fluorescence in the light emitting particles.

* * * * *